United States Patent
Min et al.

(10) Patent No.: US 7,792,216 B2
(45) Date of Patent: Sep. 7, 2010

(54) TIMING ESTIMATOR IN OQPSK DEMODULATOR

(75) Inventors: Sang Hyun Min, Kyungki-Do (KR); Hyung Jin Choi, Seoul (KR); Joo Hyun Do, Seoul (KR); Shin Woo Kang, Kyungsangnam-Do (KR); Tah Joon Park, Kyungki-Do (KR); Koon Shik Cho, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 949 days.

(21) Appl. No.: 11/549,025

(22) Filed: Oct. 12, 2006

(65) Prior Publication Data

US 2007/0121765 A1    May 31, 2007

(30) Foreign Application Priority Data

Nov. 30, 2005 (KR) .................. 10-2005-0115277
Aug. 9, 2006 (KR) .................. 10-2006-0075379

(51) Int. Cl.
*H03K 9/00* (2006.01)
*H04L 27/00* (2006.01)

(52) U.S. Cl. ................................ 375/316
(58) Field of Classification Search .......... 375/316
See application file for complete search history.

(56) References Cited

U.S. PATENT DOCUMENTS

| | | | |
|---|---|---|---|
| 5,535,252 A | | 7/1996 | Kobayashi |
| 6,016,329 A | * | 1/2000 | Iwasaki ............. 375/340 |
| 7,206,707 B1 | * | 4/2007 | Tsui et al. ............ 702/75 |

| | | |
|---|---|---|
| 2002/0061057 A1 | 5/2002 | Wakamatsu et al. |

FOREIGN PATENT DOCUMENTS

| | | |
|---|---|---|
| EP | 1 134 928 A1 | 9/2006 |
| JP | 05-167630 A | 7/1993 |
| JP | 06-252966 A | 9/1994 |
| JP | 6-284159 A | 10/1994 |
| JP | 09-307541 A | 11/1997 |
| JP | 10-150385 A | 6/1998 |
| JP | 10-155004 A | 6/1998 |
| JP | 10-290265 A | 10/1998 |
| JP | 10-303794 A | 11/1998 |
| JP | 11-146025 A | 5/1999 |
| JP | 2000-049881 A | 2/2000 |

(Continued)

*Primary Examiner*—David C Payne
*Assistant Examiner*—Tanmay K Shah
(74) *Attorney, Agent, or Firm*—Lowe Hauptman Ham & Berner (57) ABSTRACT

A timing estimator of an OQPSK demodulator is provided. In the timing estimator, an A/D converter converts an analog reception signal into a digital reception signal. A differential circuit section delays the digital reception signal from the A/D converter by a preset time and obtains a phase difference between a conjugate complex number signal of the delayed digital reception signal and the digital reception signal to offset a frequency error contained in the digital reception signal. A correlation operation section performs a correlation operation between a reference symbol differentiated in the same way as a differentiation of the differential circuit section and the reception signal to obtain each correlation value. A coherent detector detects a coherent point on the basis of the correlation value from the correlation operation section.

2 Claims, 5 Drawing Sheets

FOREIGN PATENT DOCUMENTS

| | | |
|---|---|---|
| JP | 2001-155010 A | 6/2001 |
| JP | 2001-268066 A | 9/2001 |
| JP | 2001-326699 A | 11/2001 |
| JP | 2002-217787 A | 8/2002 |
| JP | 2004-304384 A | 10/2004 |

* cited by examiner

TIMING ESTIMATOR IN OQPSK DEMODULATOR

RELATED APPLICATION

The present application is based on, and claims priorities from, Korean Application Numbers 2005-115277 and 2006-075379, filed Nov. 30, 2005 and Aug. 9, 2006, the disclosures of which are hereby incorporated by reference herein in their entirety.

BACKGROUND OF THE INVENTION

1. Field of the Invention

The present invention relates to a timing estimator of an OQPSK demodulator applied to a Zigbee receiver, and more particularly, to a timing estimator of an OQPSK demodulator that can improve degradation in receiving performance due to a frequency error by obtaining a phase difference between a conjugate complex number signal of a reception signal delayed by a set time and the received signal to offset the frequency error of the reception signal.

2. Description of the Related Art

Recently, as Ubiquitous that means a communication environment in which users can access to a network whenever and wherever they wish without a limitation in time and place is proposed, researches on the small scale wireless communication system, for example, wireless local area network (WLAN), wireless personal area network (WPAN), sensor network, RFID and the like, not on the large scale communication network, for example, cellular network, are being actively performed.

Particularly, in the field of WPAN or/and sensor network among these wireless communication systems, main requirements are an ultra miniaturization, low power consumption and low price. However, the wireless communication system, such as WPAN and the like, has a difficulty in employing the high performance and high price equipments or components used in the related art cellular wireless communication system or WLAN system without any change. To the contrary, when the wireless communication system uses low price components so as to lower the price, since a large frequency error or phase error that cannot be ignored may be generated, it is necessary to make up some counterplan for such errors.

Considering these circumstances, it is, in the communication system environment, required to research and develop a demodulator that can show an excellent performance without using the high price equipment or component. Especially, in a receiver receiving the OQPSK symbol packet, it is required to perform the symbol coherency more accurately.

The OQPSK demodulator includes a timing estimator so as to demodulate a symbol from a received signal. The related art timing estimator will now be described with reference to FIG. 1.

Figure 1:
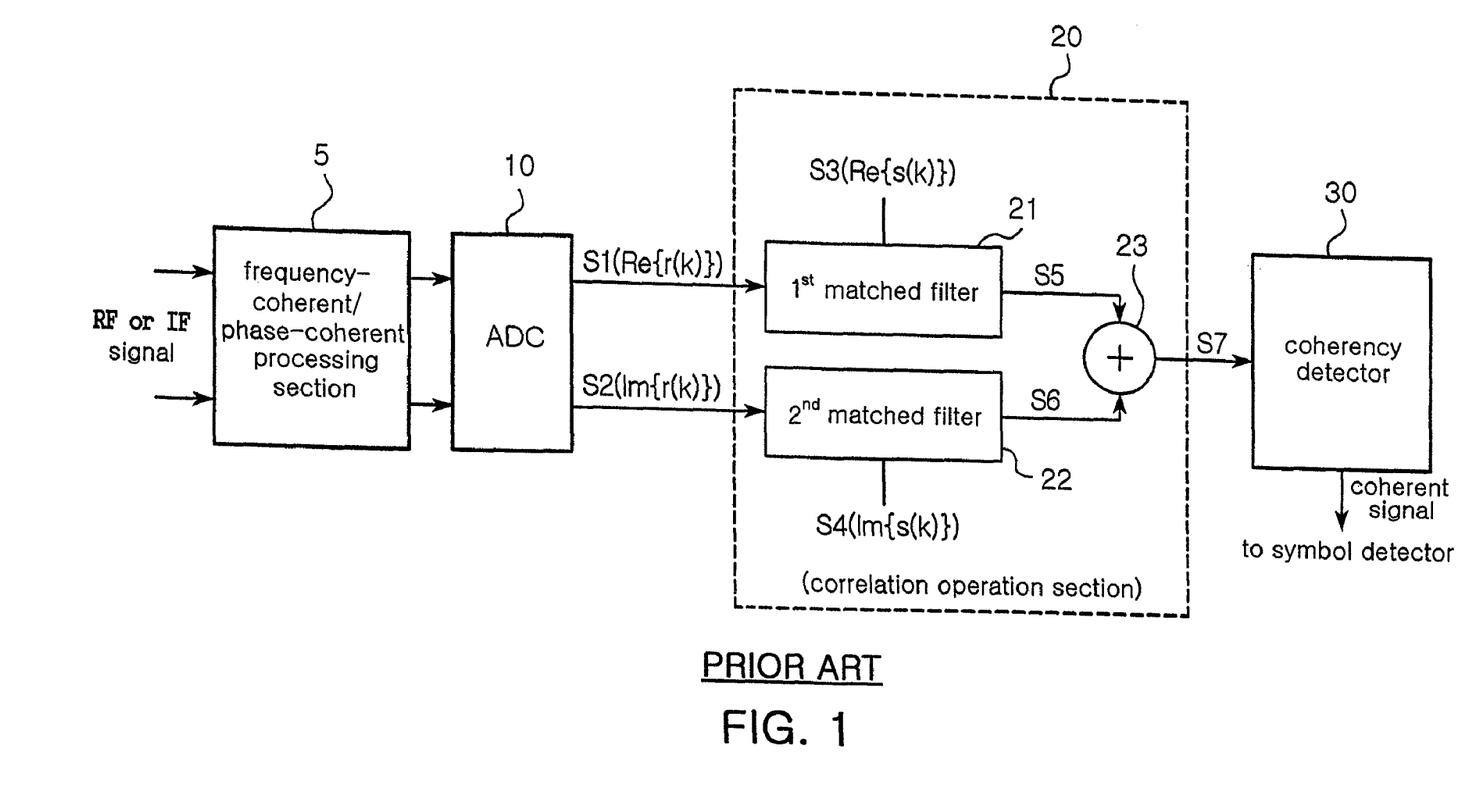
FIG. 1 is a schematic view of a timing estimator of an OQPSK according to the related art.

FIG. 1 is a schematic view of a timing estimator of an OQPSK demodulator according to the related art.

Referring to FIG. 1, the timing estimator includes a frequency-coherent/phase-coherent processing section 5 processing frequency coherency and phase coherency for an RF signal or IF signal, an A/D converter (ADC) 10 converting an analog reception signal 'Ir, Qr' of the frequency-coherent/phase-coherent processing section 5 into a digital reception signal, a correlation operating section 20 performs a correlation operation between an output signal of the A/D converter 10 and a reference symbol to obtain correlation values, and a coherency detector 30 determining a detection point when the largest correlation value is obtained by the correlation operating section 20 as a coherent point and outputting a coherent signal.

The correlation operating section 20 includes a first matched filter 21 correlating a real number part, 'r{r(k)}' of the reception signal of the A/D converter 10 with a real number part 'r{s(k)}' of the reference symbol, a second matched filter 22 correlating an imaginary number part 'im{r(k)}' of the reception signal of the A/D converter 10 with an imaginary number part 'im{s(k)}' of the reference symbol, and an adder 23 adding the correlation values of the first and second matched filters 21 and 22.

At this time, when the reception signal 'r(k)' from the A/D converter 10 and the reference symbol 's(k)' are respectively defined as shown in equation 1, output signals 'S1 and S2' of the A/D converter 10 are expressed as the below equation 2. Also, when the real number part 'S3(Re{s(k)})' and the imaginary number part 'S4(im{s(k)})' of the reference symbol respectively inputted into the first matched filter 21 and the second matched filter 22 are expressed by the below equation 3, output signals 'S5, S6' of the first and second matched filters 21 and 22 are expressed as shown in equation 4.

$$r(k) = e^{j\{\theta(k) + \Phi(k) + 2\pi\Delta f_0 k\}},$$  Equation 1:

where $\Delta f_0 = f_0 T_s$, $T_s$=sampling period, $\Phi(k)$=phase error, $f_0$=frequency error, and k=digital time index; and $$s(k) = e^{j\theta k}.$$

Equation 2:

$$S1 = \cos(\theta(k) + \Phi(k) + 2\pi\Delta f_0 k); \text{ and}$$

$$S2 = \sin(\theta(k) + \Phi(k) + 2\pi\Delta f_0 k).$$

Equation 3:

$$S3 = \cos\theta(k); \text{ and}$$

$$S4 = \sin\theta(k)$$

Equation 4:

$$S5 = \sum_{k=1}^{N} \cos(\theta(k) + \Phi(k) + 2\pi\Delta f_0 k)\cos\theta(k); \text{ and}$$

$$S6 = \sum_{k=1}^{N} \sin(\theta(k) + \Phi(k) + 2\pi\Delta f_0 k)\sin\theta(k).$$

Also, an output signal 'S7' of the adder 23 is expressed by the below equation 5, and can be converted in brief into the below equation 6 when $\Phi(k)=0$ and $2\pi\Delta f_0 k=0$ in the equation 5.

Equation 5:

$$S7 = \sum_{k=1}^{N} \left( \begin{array}{c} \cos(\theta(k) + \Phi(k) + 2\pi\Delta f_0 k)\cos\theta(k) + \\ \sin(\theta(k) + \Phi(k) + 2\pi\Delta f_0 k)\sin\theta(k) \end{array} \right).$$

Equation 6:

$$S7 = \sum_{k=1}^{N} \cos\theta(k)\cos\theta(k) + \sin\theta(k)\sin\theta(k))$$

= maximum correlation value.

However, in the related art OQPSK or demodulation method, when the final correlation output 'S7' has a phase error or frequency error component, a correlation result value is very low due to influence of the error even at a timing when the coherency is consistent, so that an exact coherency cannot be found.

So, in the case of PSK signals according to the related art, coherent demodulation is generally performed. The coherent demodulation indicates a method in which the correlation operation is performed after an RF signal received at a front side of the A/D converter is exactly consistent with a coherency of a local oscillator (L.O) of a receiver to completely remove the frequency error and phase error contained in the r(k).

However, since the related art method shows a good performance but has a very complicated system to remove the frequency error and phase error, it is not suitable for the application to a lower power and micro system.

SUMMARY OF THE INVENTION

Accordingly, the present invention is directed to a timing estimator in an OQPSK demodulator that substantially obviates one or more problems due to limitations and disadvantages of the related art.

An object of the present invention is to provide a timing estimator in an OQPSK demodulator that can improve degradation in receiving performance due to a frequency error by obtaining a phase difference between a conjugate complex number signal of a received signal delayed by a set time and the received signal to offset the frequency error of the received signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a timing estimator of an OQPSK demodulator including: an A/D converter converting an analog reception signal into a digital reception signal: a differential circuit section delaying the digital reception signal from the A/D converter by a preset time and obtaining a phase difference between a conjugate complex number signal of the delayed digital reception signal and the digital reception signal from the A/D converter to offset a frequency error contained in the digital reception signal; a correlation operation section performing a correlation operation between a reference symbol differentiated in the same way as a differentiation of the differential circuit section and the reception signal from the differential circuit section to obtain each correlation value; and a coherent detector detecting a coherent point on the basis of the correlation value from the correlation operation section.

The differential circuit section may include: a delay delaying the digital reception signal from the A/D converter by a preset time; a conjugate complex number section extracting a conjugate complex number signal from a signal from the delay; and a multiplier multiplying the digital reception signal from the A/D converter with the conjugate complex number signal from the conjugate complex number section.

The correlation operation section may include: a first matched filter performing a correlation operation between a real number part of the reference symbol differentiated in the same way as the differentiation of the digital reception signal and a real number part of the digital reception signal from the differential circuit section; a second matched filter performing a correlation operation between an imaginary number part of the reference symbol differentiated in the same way as the differentiation of the digital reception signal and an imaginary number part of the digital reception signal from the differential circuit section; a third matched filter performing a correlation operation between the real number part of the reference symbol differentiated in the same way as the differentiation of the digital reception signal and the imaginary number part of the digital reception signal from the differential circuit section; a fourth matched filter performing a correlation operation between the imaginary number part of the reference symbol differentiated in the same way as the differentiation of the digital reception signal and the real number part of the digital reception signal from the differential circuit section; a first adder adding correlation values of the first and second matched filters; a second adder adding correlation values of the third and fourth matched filters; a first squaring section obtaining the square of an output value from the first adder; a second squaring section obtaining the square of an output value from the second adder; and an adder output values of the first and second squaring sections.

The differential circuit section may include a plurality of differential filters which delay the digital reception signal from the A/D converter by different preset time intervals, respectively, extract a conjugate complex number signal from the delayed digital reception signal, and multiplies the digital reception signal with the conjugate complex number signal to offset the frequency error contained in the digital reception signal from the A/D converter.

The correlation operation section may include: a plurality of correlation operators performing a correlation operation between the imaginary number part of a corresponding reference symbol differentiated in the same way as the differentiation of a digital reception signal from each of the plurality of differential filters and the digital reception signal from each of the plurality of differential filters of the differential circuit section to obtain each correlation value; and an output adder adding the correlation values from the plurality of correlation operators.

The differential circuit section may include: a first differential filter which delays the digital reception signal from the A/D converter by a first preset time, extracts a conjugate complex number signal from the delayed digital reception signal, and multiplies the digital reception signal with the conjugate complex number signal to offset the frequency error contained in the digital reception signal; a second differential filter which delays the digital reception signal from the A/D converter by a second preset time, extracts a conjugate complex number signal from the delayed digital reception signal, and multiplies the digital reception signal with the conjugate complex number signal to offset the frequency error contained in the digital reception signal; and a third differential filter which delays the digital reception signal from the A/D converter by a third preset time, extracts a conjugate complex number signal from the delayed digital reception signal, and multiplies the digital reception signal with the conjugate complex number signal to offset the frequency error contained in the digital reception signal.

The correlation operation section may include: a first correlation operator performing a correlation operation between a signal from the first differential filter and a corresponding reference symbol; a second correlation operator performing a correlation operation between a signal from the second differential filter and a corresponding reference symbol; and a third correlation operator performing a correlation operation between a signal from the third differential filter and a corresponding reference symbol.

Each of the first to third correlation operators may include: a first matched filter performing a correlation operation between a real number part of the reference symbol differentiated in the same way as the differentiation of the digital reception signal and a real number part of the digital reception signal from the differential circuit section; a second matched filter performing a correlation operation between an imaginary number part of the reference symbol differentiated in the same way as the differentiation of the digital reception signal and an imaginary number part of the digital reception signal from the differential circuit section; and an adder adding correlation values of the first and second matched filters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 2:
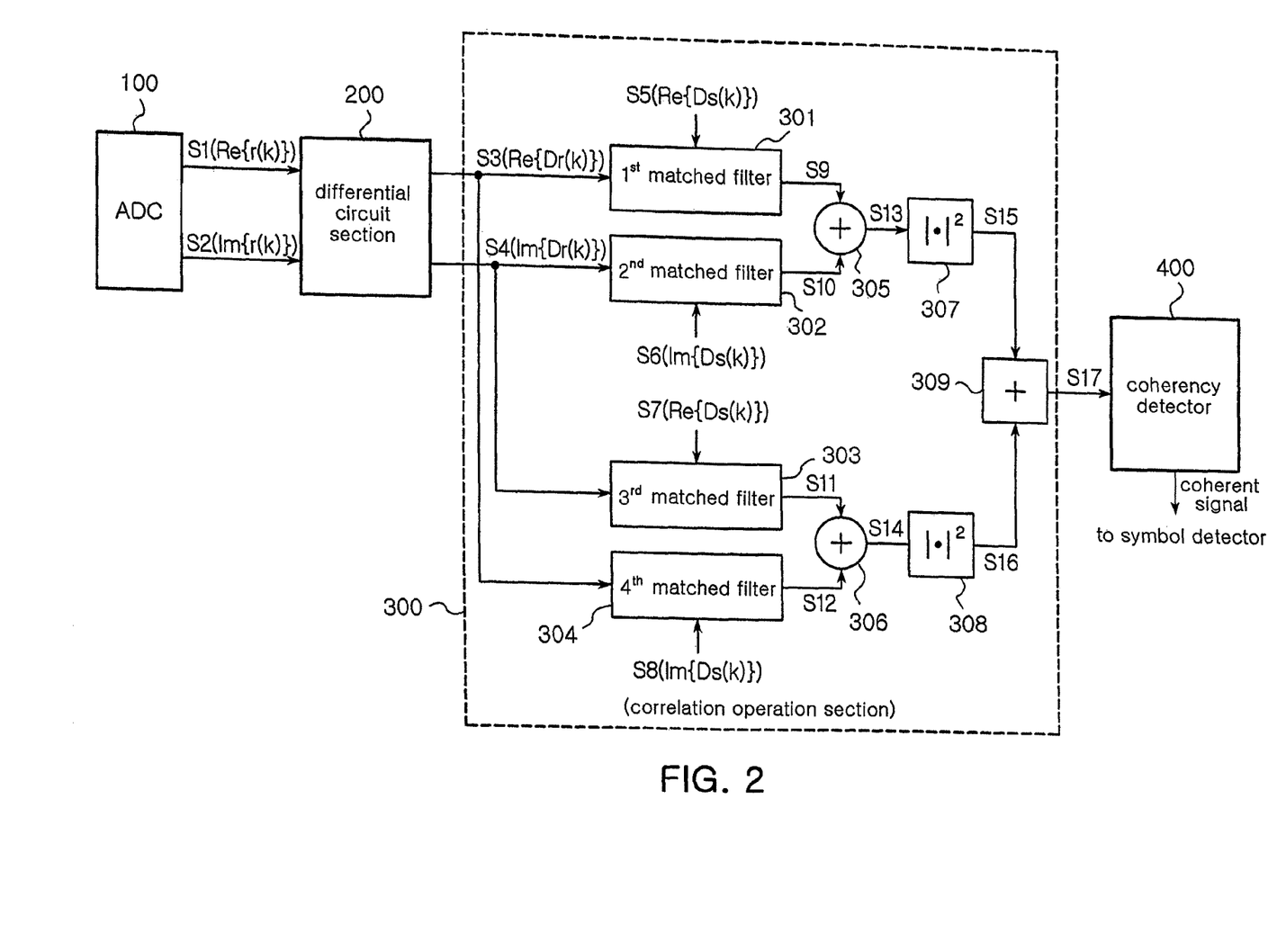
FIG. 2 is a schematic view of a timing estimator of an OQPSK according to the present invention.

FIG. 2 is a schematic view of a timing estimator of an OQPSK according to the present invention.

Referring to FIG. 2, a timing estimator of an OQPSK demodulator according to an embodiment of the present invention includes: an A/D converter 100 converting an analog reception signal 'Ir, Qr' into a digital reception signal 'r(k)': a differential circuit section 200 obtaining a phase difference between a conjugate complex number signal 'r(k−1Tc)' delayed by a preset time in the digital reception signal from the A/D converter 100 and the digital reception signal 'r(k)' from the A/D converter 100 to offset a frequency error contained in the digital reception signal 'r(k)'; a correlation operation section 300 performing a correlation operation between a reference symbol differentiated in the same way as a differentiation of the differential circuit section 200 and the reception signal from the differential circuit section 200 to obtain each correlation value; and a coherent detector 400 detecting a coherent point on the basis of the correlation value from the correlation operation section 300.

Figure 3:
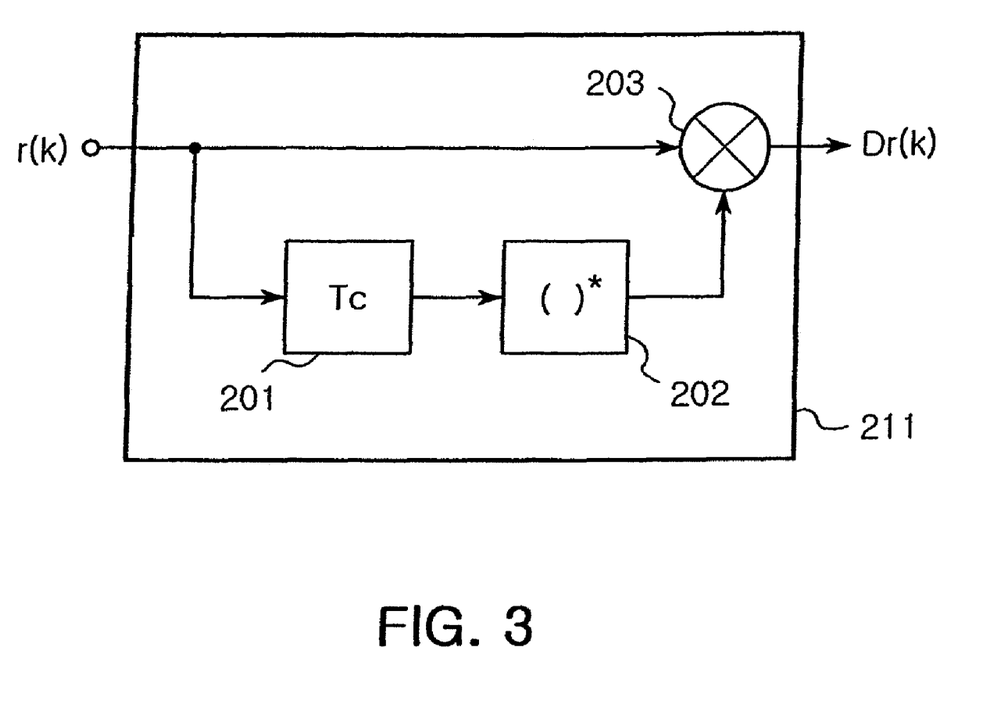
FIG. 3 is a schematic view of a differential circuit section of FIG. 2.

FIG. 3 is a schematic view of the differential circuit section of FIG. 2.

Referring to FIG. 3, the differential circuit section 200 include: a delay 201 delaying the digital reception signal 'r(k)' from the A/D converter 100 by a preset time; a conjugate complex number section 202 extracting a conjugate complex number signal from a signal from the delay 201; and a multiplier 203 multiplying the digital reception signal from the A/D converter 100 with the conjugate complex number signal from the conjugate complex number section 202.

The correlation operation section 300 includes: a first matched filter 301 performing a correlation operation between a real number part 'Re{Ds(k)}' of the reference symbol differentiated in the same way as the differentiation of the digital reception signal and a real number part 'Re{Dr(k)}' of the digital reception signal 'Dr(k)' from the differential circuit section 200; a second matched filter 302 performing a correlation operation between an imaginary number part 'Im{Ds(k)}' of the reference symbol differentiated in the same way as the differentiation of the digital reception signal 'Dr(k)' and an imaginary number part 'Im{Dr(k)}' of the digital reception signal from the differential circuit section 200; a third matched filter 303 performing a correlation operation between the real number part 'Re{Ds(k)}' of the reference symbol differentiated in the same way as the differentiation of the digital reception signal 'Dr(k)' and the imaginary number part 'Im{Dr(k)}' of the digital reception signal from the differential circuit section 200; a fourth matched filter 304 performing a correlation operation between the imaginary number part 'Im{Ds(k)}' of the reference symbol differentiated in the same way as the differentiation of the digital reception signal 'Dr(k)' and the real number part 'Re{Dr(k)}' of the digital reception signal 'Dr(k)' from the differential circuit section 200; a first adder 305 adding correlation values S1 and S2 of the first and second matched filters 301 and 302; a second adder 306 adding correlation values S11 and S12 of the third and fourth matched filters 303 and 304; a first squaring section 307 obtaining the square of an output value S13 from the first adder 305; a second squaring section 308 obtaining the square of an output value S14 from the second adder 306; and an adder output values S15 and S16 of the first and second squaring sections 307 and 308.

Figure 4:
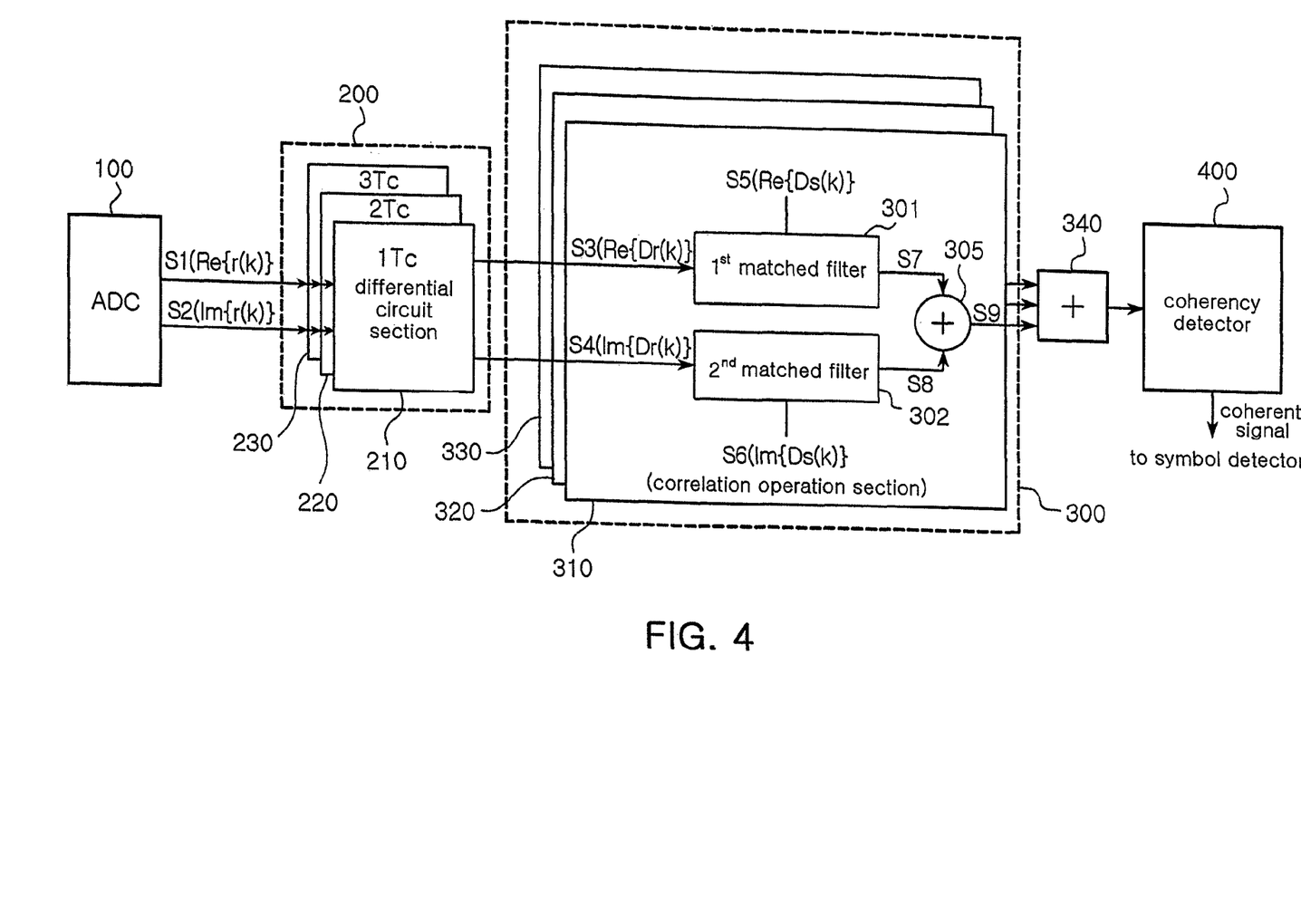
FIG. 4 is a schematic view of a modified timing estimator of an OQPSK according to the present invention.

FIG. 4 is a schematic view of a modified timing estimator of an OQPSK according to the present invention.

Referring to FIG. 4, the timing estimator of an OQPSK according to the present embodiment is a modification of the timing estimator shown in FIG. 2, and the differential circuit section 200 and the correlation operation section 300 of the timing estimator shown in FIG. 2 can be modified as follows.

Referring to FIG. 4, the differential circuit section 200 includes a plurality of differential filters which delay the digital reception signal from the A/D converter 100 by different preset time intervals, respectively, extract a conjugate complex number signal from the delayed digital reception signal, and multiply the digital reception signal from the A/D converter 100 with the conjugate complex number signal to offset the frequency error contained in the digital reception signal from the A/D converter 100.

The correlation operation section 300 can include: a plurality of correlation operators performing a correlation operation between a corresponding reference symbol differentiated in the same way as the differentiation of the differential circuit section and the digital reception signal from each of the plurality of differential filters of the differential circuit section

200 to obtain each correlation value; and an output adder adding the correlation values from the plurality of correlation operators.

One example of the differential circuit section 200 can include first to third differential filters 210, 220 and 230.

The first differential filter 210 delays the digital reception signal from the A/D converter 100 by a first preset time '1TC', extracts a conjugate complex number signal from the delayed digital reception signal, and multiplies the digital reception signal from the A/D converter 100 with the delayed conjugate complex number signal to offset the frequency error contained in the digital reception signal.

The second differential filter 220 delays the digital reception signal from the A/D converter 100 by a second preset time '2TC', extracts a conjugate complex number signal from the delayed digital reception signal, and multiplies the digital reception signal from the A/D converter 100 with the delayed conjugate complex number signal to offset the frequency error contained in the digital reception signal.

The third differential filter 230 delays the digital reception signal from the A/D converter 100 by a third preset time '3TC', extracts a conjugate complex number signal from the delayed digital reception signal, and multiplies the digital reception signal from the A/D converter 100 with the delayed conjugate complex number signal to offset the frequency error contained in the digital reception signal.

Figure 5:
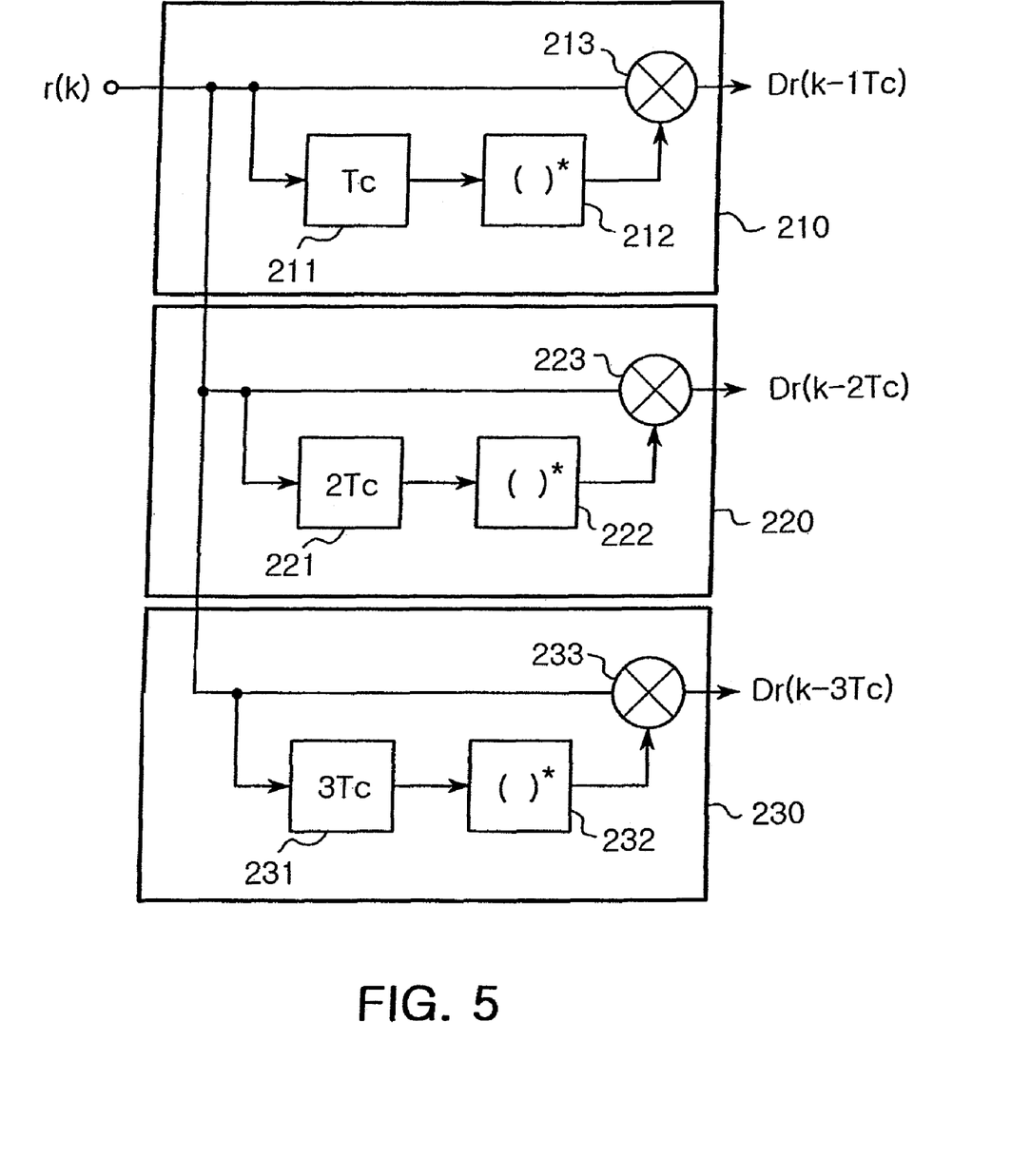
FIG. 5 is a schematic view of a differential circuit section of FIG. 4.

Also, the first to third differential filters 210, 220 and 230 can be implemented as shown in FIG. 5.

FIG. 5 is a schematic view of the differential circuit section of FIG. 4. The first to third differential filters 210, 220 and 230 will be specifically described with reference to FIG. 5.

Referring to FIG. 5, the first differential filter 210 includes a delay 211 delaying the digital reception signal 'r(k)' from the A/D converter 100 by a first preset time '1TC', a conjugate complex number section 212 extracting a conjugate complex number signal from an output signal of the delay 211, and a multiplier 213 multiplying the digital reception signal 'r(k)' from the A/D converter 100 with the conjugate complex number signal from the conjugate complex number section 212.

The second differential filter 220 includes a delay 221 delaying the digital reception signal 'r(k)' from the A/D converter 100 by a second preset time '2TC', a conjugate complex number section 222 extracting a conjugate complex number signal from an output signal of the delay 221, and a multiplier 223 multiplying the digital reception signal 'r(k)' from the A/D converter 100 with the conjugate complex number signal from the conjugate complex number section 222.

The third differential filter 230 includes a delay 231 delaying the digital reception signal 'r(k)' from the A/D converter 100 by a third preset time '3TC', a conjugate complex number section 222 extracting a conjugate complex number signal from an output signal of the delay 231, and a multiplier 233 multiplying the digital reception signal 'r(k)' from the A/D converter 100 with the conjugate complex number signal from the conjugate complex number section 232.

Referring to FIGS. 4 and 5 in relation to the embodiments of the differential circuit section 200, the correlation operation section 300 can include a first correlation operator 310 performing a correlation operation between an output signal from the first differential filter 210 and a corresponding reference symbol; a second correlation operator 320 performing a correlation operation between an output signal from the second differential filter 220 and a corresponding reference symbol; a third correlation operator 330 performing a correlation operation between an output signal from the third differential filter 230 and a corresponding reference symbol; and an output adder 340 adding the respective correlation values from the first to third correlation operators 310, 320 and 330.

At this time, each of the first to third correlation operators 310, 320 and 330 includes: a first matched filter 301 performing a correlation operation between a real number part 'Re{Ds(k)}' of the reference symbol differentiated in the same way as the differentiation of the digital reception signal 'Dr(k)' and a real number part 'Re{Dr(k)}' of the digital reception signal 'Dr(k)' from the differential circuit section 200; a second matched filter 302 performing a correlation operation between an imaginary number part 'Im{Ds(k)}' of the reference symbol differentiated in the same way as the differentiation of the digital reception signal and an imaginary number part 'Im{Dr(k)}' of the digital reception signal 'Dr(k)' from the differential circuit section 200; and an adder 305 adding correlation values 'S9 and S10' of the first and second matched filters 301 and 302.

Hereinafter, operations and effects of the present invention will be described with reference to the accompanying drawings.

The timing estimator of the OQPSK demodulator according to an embodiment of the present invention will be described with reference to FIGS. 2 to 6. First, in the timing estimator of FIG. 2, the A/D converter 100 converts analog reception signals 'Ir and Qr' into a digital reception signal 'r(k)' and outputs the converted digital reception signal 'r(k)' to the differential circuit section 200.

When reference symbol 's(k)', reference symbol 'Ds(k)' obtained by differentiating the reference symbol 's(k)', and the reception signal 'r(k)' are expressed by the below equation 7, the output signals 'S1 and S2' from the A/D converter 100 are expressed by the below equation 8:

$$s(k)=e^{j\theta(k)};$$

$$Ds(k)=s(k)s^*(k-1)=e^{j(\theta(k)-\theta(k-1))}=e^{j\Phi(k)};$$

$$r(k)=e^{j(\theta(k)+\Phi(k-1)-2\pi\Delta f_0 k)},$$ Equation 7:

where $\Phi(k)$=phase error, $f_0$=frequency error $(k)=r(k)r^*(k-1)=$
$e^{j\{(\theta(k)-\theta(k-1)+\Phi(k)-\Phi(k-1)-2\pi\Delta f_0 k)-2\pi\Delta f_0 k\}-2\pi\Delta f_0)}$ if $(\Phi(k)=\Phi(k-1))$
$(k)=e^{j\{(\theta(k)-\theta(k-1)+2\pi\Delta f_0)\}}=e^{(\Phi(k)-2\pi\Delta f_0)}$.

$s1=\cos(\theta(k)+\Phi(k)+2\pi\Delta f_0 k);$ and $s2=\sin(\theta(k)+\Phi(k)+2\pi\Delta f_0 k).$ Equation 8:

The differential circuit section 200 obtains a phase difference between a conjugate complex number signal 'r(k−1Tc)' delayed by a preset time in the digital reception signal from the A/D converter 100 and the digital reception signal 'r(k)' from the A/D converter 100 and outputs the obtained phase difference to the correlation operation section 300. At this time, a frequency error contained in the digital reception signal 'r(k)' is offset by the differential circuit section.

The correlation operation section 300 performs a correlation operation between a reference symbol differentiated in the same way as a differentiation of the differential circuit section 200 and the reception signal from the differential circuit section 200 to obtain each correlation value, and outputs the obtained correlation value to the coherent detector 400.

The coherent detector 400 detects a coherent point on the basis of the correlation value from the correlation operation section 300, and outputs a coherent signal.

The differential circuit section 200 will now be described with reference to FIG. 3.

In FIG. 3, the delay 201 of the differential circuit section 200 delays the digital reception signal 'r(k)' from the A/D converter 100 by a preset time, and outputs the delayed digital reception signal to the conjugate complex number section 202.

The conjugate complex number section 202 extracts a conjugate complex number signal from an output signal of the delay 201, and outputs the extracted conjugate complex number signal to the multiplier 203.

The multiplier 203 multiplies the digital reception signal 'r(k)' from the A/D converter 100 with the conjugate complex number signal from the conjugate complex number section 202, and outputs an obtained value to the correlation operation section 300.

The output signals 'S3 and S4' of the differential circuit section 200 are expressed by the below equation 9:

$$s3 = \cos(\Phi(k) - 2\pi\Delta f_0); \text{ and}$$

$$s4 = \sin(\Phi(k) - 2\pi\Delta f_0). \qquad \text{Equation 9:}$$

The correlation operation section 300 will now be described with reference to FIGS. 2 and 3.

Referring to FIG. 2, in case where the correlation operation section 300 includes the first to fourth matched filters 301 to 304, the first matched filter 301 performs a correlation operation between a real number part 'Re{Ds(k)}' of the reference symbol differentiated in the same way as the differentiation of the digital reception signal and a real number part 'Re{Dr(k)}' of the digital reception signal 'Dr(k)' from the differential circuit section 200, the second matched filter 302 performs a correlation operation between an imaginary number part 'Im{Ds(k)}' of the reference symbol differentiated in the same way as the differentiation of the digital reception signal 'Dr(k)' and an imaginary number part 'Im{Dr(k)}' of the digital reception signal from the differential circuit section 200, the third matched filter 303 performs a correlation operation between the real number part 'Re{Ds(k)}' of the reference symbol differentiated in the same way as the differentiation of the digital reception signal 'Dr(k)' and the imaginary number part 'Im{Dr(k)}' of the digital reception signal from the differential circuit section 200, and the fourth matched filter 304 performs a correlation operation between the imaginary number part 'Im{Ds(k)}' of the reference symbol differentiated in the same way as the differentiation of the digital reception signal 'Dr(k)' and the real number part 'Re{Dr(k)}' of the digital reception signal 'Dr(k)' from the differential circuit section 200.

In FIG. 2, when the real number part and the imaginary number part S5 to S8 of the reference symbol are expressed by the below equation 10, the output signals S9 to S12 of the first to fourth matched filters 301 to 304 are expressed by the below equation 11:

Equation 10:

$$s5 = \cos\Phi(k);$$

$$s6 = \sin\Phi(k);$$

$$s7 = \cos\Phi(k); \text{ and}$$

$$s9 = -\sin\Phi(k).$$

Equation 11:

$$S9 = \sum_{k=1}^{N} \cos(\Phi(k) - 2\pi\Delta f_0)\cos\Phi(k);$$

-continued $$S10 = \sum_{k=1}^{N} \sin(\Phi(k) - 2\pi\Delta f_0)\sin(\Phi(k));$$

$$S11 = \sum_{k=1}^{N} \sin(\Phi(k) - 2\pi\Delta f_0)\cos(\Phi(k)); \text{ and}$$

$$S12 = \sum_{k=1}^{N} \cos(\Phi(k) - 2\pi\Delta f_0)\sin(\Phi(k)).$$

Also, the first adder 305 of the correlation operation section 300 adds the correlation values 'S9 and S10' of the first and second matched filters 301 and 302, and the second adder 306 of the correlation operation section 300 adds the correlation values 'S11 and S12' of the third and fourth matched filters 303 and 304.

Next, the first squaring section 307 of the correlation operation section 300 square an output value S13 from the first adder 305, and the second squaring section 308 obtaining the square of an output value S14 from the second adder 306; and an adder output values S15 and S16 of the first and second squaring sections 307 and 308.

At this time, the respective output signals 'S13 and S14' of the first and second adders 305 and 306 are expressed by the below equation 12, and the output signals 'S15 and S16' of the first and second squaring sections 307 and 308 and the output signal 'S17' of the adder 309 are expressed by the below equation 13.

Equation 12:

$$S13 = \sum_{k=1}^{N} (\cos(\Phi(k) - 2\pi\Delta f_0)\cos\Phi(k) + \sin(\Phi(k) - 2\pi\Delta f_0)\sin(\Phi(k));$$

$$= \frac{1}{2}\sum_{k=1}^{N} (\cos(2\Phi(k) - 2\pi\Delta f_0) + \cos(2\pi\Delta f_0) + \cos(2\pi\Delta f_0) -$$

$$\cos(2\Phi(k) - 2\pi\Delta f_0)$$

$$= N\cos(2\pi\Delta f_0); \text{ and}$$

$$S14 = \sum_{k=1}^{N} \sin(\Phi(k) - 2\pi\Delta f_0)\cos\Phi(k) + \cos(\Phi(k) - 2\pi\Delta f_0)\sin(\Phi(k));$$

$$= \frac{1}{2}\sum_{k=1}^{N} (\sin(-2\pi\Delta f_0) - \sin(2\Phi(k) - 2\pi\Delta f_0) - \sin(-2\pi\Delta f_0) +$$

$$\sin(2\Phi(k) - 2\pi\Delta f_0)$$

$$= N\sin(2\pi\Delta f_0).$$

Equation 13:

$$S15 = (N\cos(2\pi\Delta f_0))^2;$$

$$S16 = (N\sin(2\pi\Delta f_0))^2; \text{ and}$$

$$S17 = (N\cos(2\pi\Delta f_0))^2 + (N\sin(2\pi\Delta f_0))^2$$

$$= N^2 \text{ maximum correlation value.}$$

As described above with reference to FIGS. 2 and 3, the timing estimator of the OQPSK of the present invention can offset the frequency error contained in the reception signal through the differential circuit section to prevent the degradation in the receiving performance.

Meanwhile, in case where the timing estimator of the OQPSK of the present invention is modified as shown in FIGS. 4 and 5, the coherency can be detected more accurately relative to the timing estimator of the related art.

The differential circuit section 200 can include the plurality of differential filters, and the correlation operation section 300 can also include the plurality of correlation operators. In relation to this, another embodiment of the present invention will be described with reference to FIGS. 4 and 5.

Referring to FIGS. 4 and 5, an embodiment that the differential circuit section 200 includes the first to third differential filters 210, 220 and 230, and the correlation operation section 300 includes the first to third correlation operators 310, 320 and 330 will be described.

The first differential filter 210 delays the digital reception signal from the A/D converter 100 by a first preset time '1TC', extracts a conjugate complex number signal from the delayed digital reception signal, and multiplies the digital reception signal with the delayed conjugate complex number signal to offset the frequency error contained in the digital reception signal.

The second differential filter 220 delays the digital reception signal from the A/D converter 100 by a second preset time '2TC', extracts a conjugate complex number signal from the delayed digital reception signal, and multiplies the digital reception signal with the delayed conjugate complex number signal to offset the frequency error contained in the digital reception signal.

The third differential filter 230 delays the digital reception signal from the A/D converter 100 by a third preset time '3TC', extracts a conjugate complex number signal from the delayed digital reception signal, and multiplies the digital reception signal with the delayed conjugate complex number signal to offset the frequency error contained in the digital reception signal.

Referring to FIG. 5, in the first differential filter 210, the delays 211 delays the digital reception signal 'r(k)' from the A/D converter 100 by a first preset time '1TC' and outputs a delayed digital reception signal to the conjugate complex number section 212. The conjugate complex number section 212 extracts a conjugate complex number signal from the delayed digital reception signal from the delay 211 and outputs the extracted conjugate complex number signal to the multiplier 213. The multiplier 213 multiplies the digital reception signal 'r(k)' from the A/D converter 100 with the delayed conjugate complex number signal from the conjugate complex number section 212 and outputs an output signal to the first correlation operator 310 of the correlation operation section 300.

In the second differential filter 220, the delays 221 delays the digital reception signal 'r(k)' from the A/D converter 100 by a second preset time '2TC' and outputs a delayed digital reception signal to the conjugate complex number section 222. The conjugate complex number section 222 extracts a conjugate complex number signal from the delayed digital reception signal from the delay 221 and outputs the extracted conjugate complex number signal to the multiplier 223. The multiplier 223 multiplies the digital reception signal 'r(k)' from the A/D converter 100 with the delayed conjugate complex number signal from the conjugate complex number section 222 and outputs an output signal to the second correlation operator 320 of the correlation operation section 300.

In the third differential filter 230, the delays 231 delays the digital reception signal 'r(k)' from the A/D converter 100 by a third preset time '3TC' and outputs a delayed digital reception signal to the conjugate complex number section 232. The conjugate complex number section 232 extracts a conjugate complex number signal from the delayed digital reception signal from the delay 231 and outputs the extracted conjugate complex number signal to the multiplier 233. The multiplier 233 multiplies the digital reception signal 'r(k)' from the A/D converter 100 with the delayed conjugate complex number signal from the conjugate complex number section 232 and outputs an output signal to the third correlation operator 330 of the correlation operation section 300.

Also, referring to FIG. 4, in relation to the embodiments of the differential circuit section 200, the correlation operation section 300 includes the first to third correlation operators 310, 320 and 330. The first correlation operator 310 of the correlation operation section 300 performs a correlation operation between an output signal of the first differential filter 210 and a corresponding reference symbol, the second correlation operator 320 performs a correlation operation between an output signal of the second differential filter 220 and a corresponding reference symbol, and the third correlation operator 330 performs a correlation operation between an output signal of the third differential filter 230 and a corresponding reference symbol. The output adder 340 adds the respective correlation values from the first to third correlation operators 310, 320 and 330.

At this time, in case where each of the correlation operators 310, 320 and 330 includes the first matched filter 301, the second matched filter 302 and the adder 305, the first matched filter 301 performs a correlation operation between a real number part 'Re{Ds(k)}' of the reference symbol differentiated in the same way as the differentiation of the digital reception signal and a real number part 'Re{Dr(k)}' of the digital reception signal 'Dr(k)' from the differential circuit section 200, the second matched filter 302 performs a correlation operation between an imaginary number part 'Im{Ds(k)}' of the reference symbol differentiated in the same way as the differentiation of the digital reception signal 'Dr(k)' and an imaginary number part 'Im{Dr(k)}' of the digital reception signal from the differential circuit section 200, and the adder 305 adds the correlation values 'S9 and S10' of the first and second matched filters 301 and 302 and outputs an added value to the output adder 340.

At this time, as described in FIG. 4 with reference to FIG. 2, when it is assumed that S3 equals to S4, the real number part S5 and the imaginary number part S6 of the reference symbol inputted into the first and second matched filters 301 and 302 are expressed by the below equation 14, and the output signals 'S7 and S8' of the first and second matched filters 301 and 302 can be expressed by the below equation 15.

Equation 14:

$s5 = \cos\Phi(k)$; and $s6 = \sin\Phi(k)$.

Equation 15:

$$S7 = \sum_{k=1}^{N} \cos(\Phi(k) - 2\pi\Delta f_0)\cos\Phi(k);$$

$$S8 = \sum_{k=1}^{N} \sin(\Phi(k) - 2\pi\Delta f_0)\sin(\Phi(k));$$

And, the output signal 'S9' of the first adder 305 is expressed by the below equation 16.

Equation 16:

$$S9 = \sum_{k=1}^{N} (\cos(\Phi(k) - 2\pi\Delta f_0)\cos\Phi(k) + \sin(\Phi(k) - 2\pi\Delta f_0)\sin(\Phi(k));$$
$$= \frac{1}{2}\sum_{k=1}^{N} (\cos(2\Phi(k) - 2\pi\Delta f_0) + \cos(2\pi\Delta f_0) + \cos(2\pi\Delta f_0) - \cos(2\Phi(k) - 2\pi\Delta f_0)$$
$$= N\cos(2\pi\Delta f_0).$$

As aforementioned, according to the present invention, a phase error component due to a frequency error is not completely removed but has an influence on a final correlation output value. However, since the size of the frequency error is determined by an analog frequency error component '$f_0$', a sampling period 'Ts', and a differential time interval 'Tc' of the differential filter, by designing Ts and Tc very small, it is possible to decrease the size of '$2\pi\Delta f_0$', thereby minimizing the size decrease due to '$\cos(2\pi\Delta f_0)$'.

Compared with the embodiment of FIG. 2, the embodiment of FIG. 4 according to the present invention has an advantage in that when the frequency error is not a very large, the performance degradation is not so much, the complexity of the system can be decreased, and the influence on the square loss in a low signal to noise ratio (i.e., S/N ratio) is little.

As aforementioned, according to the present invention, a larger correlation value can be obtained, and thus a failure rate in detecting the coherent point is low such that the coherent point can be rapidly detected and performance is enhanced.

As described above, according to the present invention, in the timing estimator of the OQPSK demodulator applied in the Zigbee receiver, a phase difference between a conjugate complex number signal of a reception signal delayed by a set time and the reception signal is obtained to offset the frequency error of the reception signal, thereby improving the degradation in the receiving performance due to the frequency error.

In detail, the differential filters are used to decrease the influence due to the frequency error, thus compensating for the degradation in the receiving performance due to the frequency error to improve the receiving performance. Even in the circumstance having a very large frequency error, the degradation in the performance due to the frequency error can be minimized by setting the delay time of the differential filter shorter than a period of a chip. Therefore, the correlation operation section that employs a simple coherent way not the noncoherent way causing a square loss and increasing the complexity is used to improve the performance/provide the same performance (performance of final proposal way to initial improvement way) and decrease the complexity.

Also, a signal multiple-differentiated with respect to a plurality of delay times is used and a multiple correlation operation is performed. Thereafter, these operation results are considered together, enabling a further improvement in performance. That is, by using the plurality of differential filters and the plurality of correlation operators, it is possible to further improve the performance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A timing estimator of an OQPSK demodulator comprising:
   an A/D converter for converting an analog reception signal into a digital reception signal;
   a differential circuit section for delaying the digital reception signal from the A/D converter by a preset time and obtaining a phase difference between a conjugate complex number signal of the delayed digital reception signal and the digital reception signal from the A/D converter to offset a frequency error contained in the digital reception signal;
   a correlation operation section for performing a correlation operation between a reference symbol differentiated in the same way as a differentiation of the differential circuit section and the reception signal from the differential circuit section to obtain each correlation value; and
   a coherent detector for detecting a coherent point on the basis of the correlation value from the correlation operation section;
   wherein the differential circuit section comprises:
     a delay for delaying the digital reception signal from the A/D converter by a preset time;
     a conjugate complex number section for extracting a conjugate complex number signal from a signal from the delay; and
     a multiplier for multiplying the digital reception signal from the A/D converter with the conjugate complex number signal from the conjugate complex number section; and
   wherein the correlation operation section comprises:
   a first matched filter for performing a correlation operation between a real number part of the reference symbol differentiated in the same way as the differentiation of the digital reception signal and a real number part of the digital reception signal from the differential circuit section;
   a second matched filter for performing a correlation operation between an imaginary number part of the reference symbol differentiated in the same way as the differentiation of the digital reception signal and an imaginary number part of the digital reception signal from the differential circuit section;
   a third matched filter for performing a correlation operation between the real number part of the reference symbol differentiated in the same way as the differentiation of the digital reception signal and the imaginary number part of the digital reception signal from the differential circuit section;
   a fourth matched filter for performing a correlation operation between the imaginary number part of the reference symbol differentiated in the same way as the differentiation of the digital reception signal and the real number part of the digital reception signal from the differential circuit section;
   a first adder for adding correlation values of the first and second matched filters;
   a second adder for adding correlation values of the third and fourth matched filters;
   a first squaring section for obtaining the square of an output value from the first adder;
   a second squaring section for obtaining the square of an output value from the second adder; and an adder for outputting values of the first and second squaring sections.

2. A timing estimator of an OQPSK demodulator comprising:

an A/D converter converting an analog reception signal into a digital reception signal;

a differential circuit section for delaying the digital reception signal from the A/D converter by a preset time and obtaining a phase difference between a conjugate complex number signal of the delayed digital reception signal and the digital reception signal from the A/D converter to offset a frequency error contained in the digital reception signal;

a correlation operation section for performing a correlation operation between a reference symbol differentiated in the same way as a differentiation of the differential circuit section and the reception signal from the differential circuit section to obtain each correlation value; and a coherent detector for detecting a coherent point on the basis of the correlation value from the correlation operation section;

wherein the differential circuit section comprises:

a delay for delaying the digital reception signal from the A/D converter by a preset time;

a conjugate complex number section for extracting a conjugate complex number signal from a signal from the delay; and a multiplier for multiplying the digital reception signal from the A/D converter with the conjugate complex number signal from the conjugate complex number section;

wherein the correlation operation section comprises:

a plurality of correlation operators for performing a correlation operation between the imaginary number part of a corresponding reference symbol differentiated in the same way as the differentiation of a digital reception signal from each of the plurality of differential filters and the digital reception signal from each of the plurality of differential filters of the differential circuit section to obtain each correlation value; and an output adder for adding the correlation values from the plurality of correlation operators; and wherein each of the plurality of correlation operators comprises:

a first matched filter for performing a correlation operation between a real number part of the reference symbol differentiated in the same way as the differentiation of the digital reception signal and a real number part of the digital reception signal from the differential circuit section;

a second matched filter for performing a correlation operation between an imaginary number part of the reference symbol differentiated in the same way as the differentiation of the digital reception signal and an imaginary number part of the digital reception signal from the differential circuit section; and an adder for adding correlation values of the first and second matched filters.

\* \* \* \* \*